US012776188B2

(12) United States Patent
Khan et al.

(10) Patent No.: US 12,776,188 B2
(45) Date of Patent: Oct. 27, 2026

(54) ENABLING USERS OF A TRAVEL RESERVATION SERVICE TO GAIN IN-GAME VIRTUAL AWARDS FOR RESERVING TRAVEL-RELATED EXPERIENCES

(71) Applicant: Atlas Reality, Inc., Austin, TX (US)

(72) Inventors: Tawsif Khan, Austin, TX (US); Beau L. Button, Austin, TX (US); Manning Reynolds Field, Coto de Caza, CA (US)

(73) Assignee: ATLAS REALITY, INC., Austin, TX (US)

( * ) Notice: Subject to any disclaimer, the term of this patent is extended or adjusted under 35 U.S.C. 154(b) by 160 days.

(21) Appl. No.: 18/927,566

(22) Filed: Oct. 25, 2024

(65) Prior Publication Data

US 2025/0140065 A1 May 1, 2025

Related U.S. Application Data

(60) Provisional application No. 63/593,850, filed on Oct. 27, 2023.

(51) Int. Cl.
*G07F 17/32* (2006.01)
*G06Q 10/02* (2012.01)
*G06Q 30/0207* (2023.01)

(52) U.S. Cl.
CPC ......... *G07F 17/3255* (2013.01); *G06Q 10/02* (2013.01); *G06Q 30/0209* (2013.01); *G07F 17/323* (2013.01)

(58) Field of Classification Search
CPC ... G07F 17/3255; G07F 17/323; G06Q 10/02; G06Q 30/0209; G06Q 10/0285
See application file for complete search history.

(56) References Cited

U.S. PATENT DOCUMENTS

2002/0143614 A1* 10/2002 MacLean ........... G06Q 30/0227 705/14.28
2009/0011836 A1* 1/2009 Friesen ............... G07F 17/3255 463/43
2012/0150695 A1* 6/2012 Fan ........................ G06Q 10/40 705/27.1
2013/0268342 A1* 10/2013 Tune .................. G06Q 30/0207 705/14.29
2021/0279762 A1* 9/2021 Eklund .............. G06Q 30/0226

OTHER PUBLICATIONS

International Search Report and Written Opinion dated Jan. 28, 2025 for International Application No. PCT/US2024/053284, 16 pages.

* cited by examiner

*Primary Examiner* — Oschta I Montoya
(74) *Attorney, Agent, or Firm* — Dorsey & Whitney LLP; Alberto Araiza

(57) ABSTRACT

Technical solutions are described that enable users of a travel reservation service to earn in-game virtual awards (e.g., in-game virtual currency) in an electronic game nearly instantly or in real-time when the users reserve a travel-related experience, such as a hotel or car rental. In contrast to existing solutions, embodiments disclosed herein enable in-game virtual awards to be granted without significant delay after reservation of the travel-related experience, because the in-game virtual awards are controlled in the closed-loop ecosystem of the electronic game. In some examples, the users reserve the travel-related experience via the travel reservation service.

16 Claims, 9 Drawing Sheets

*FIG. 1*
HOME
FREE BUCKS
BUY BUCKS
106
SHOP
BOOK TRAVEL
SURVEYS
108
100
ATLAS TRAVEL
Find Your Perfect Getaway and Reap the Rewards
Hotel
102
Where to?
Check-in – Check-out
1 room, 2 guests
Search
Popular Destinations
Las Vegas
Orlando
Cancun
104

300

ENABLING USERS OF A TRAVEL RESERVATION SERVICE TO GAIN IN-GAME VIRTUAL AWARDS FOR RESERVING TRAVEL-RELATED EXPERIENCES

CROSS-REFERENCE TO RELATED APPLICATIONS

This application claims priority to and the benefits of U.S. Provisional Application No. 63/593,850, titled “ENABLING PLAYERS TO GAIN IN-GAME VIRTUAL CURRENCY NEARLY INSTANTLY WHEN BOOKING HOTELS AND CAR RENTALS” filed on Oct. 27, 2023. The content of the aforementioned application is herein incorporated by reference in its entirety.

BACKGROUND

A video game is an electronic game that involves interaction with a user interface or input device (such as a joystick, controller, keyboard, or motion sensing device) to generate visual feedback from a display device, most commonly shown in a video format on a television set, computer monitor, flat-panel display, touchscreen on handheld devices, or a virtual reality headset. The global video game market is one of the largest markets in the modern entertainment industry.

Many video games incorporate an in-game currency, which is a monetization mechanic for facilitating purchases of in-game assets or gameplay advantages. In-game currency can often be purchased with real-world currency or earned through completing in-game tasks.

DETAILED DESCRIPTION

I. Overview

Figure 1:
FIG. 1 shows an example travel search interface provided within an electronic game through which a player initiates reserving a travel-related experience.

The present document provides various techniques for using electronics in a gaming system for enabling players of an electronic game to gain in-game virtual awards (e.g., in-game currency, items) nearly instantly or in real-time when reserving travel-related experiences (e.g., booking hotels, car rentals). In contrast to existing solutions, embodiments disclosed herein provide in-game virtual awards without significant delay after execution of the travel-related transaction, because the in-game virtual awards are controlled in the closed-loop ecosystem of the electronic game. In some embodiments, the players reserve the travel-related experience via the electronic game by communicating with a third-party service.

II. Technical Benefits and Advantages

Most travel reservation services offer cashback or other perks when booking travel-related experiences. These rewards are released after a traveler completes the experience, not upon making the booking. This delay is mostly due to handling fraud or cancelation; for example, clawing back cashback or free hotel stays is nearly impossible once those rewards have been given out. Thus, travel reservation services must typically wait until they receive commission from a reserved travel-related experience in order to pass a reward onto the user who made the reservation.

Many video games use in-game virtual currencies that can be converted into other in-game assets and vice-versa within a closed-loop ecosystem. A closed-loop ecosystem means that, while in-game assets can be converted into one another, these assets cannot be converted into any assets outside of the game system itself. For that reason, any value added into a video game with a closed-loop ecosystem remains within the game indefinitely unless changes are made by the video game’s developers. This feature allows video games to grant in-game virtual awards to players who reserve a travel-related experience nearly instantaneously after the reservation is made without the risk of financial loss. Because the value of the in-game virtual award can never be removed from the game by the player, the award or some in-game asset of equal value can always be clawed back by the game developers, either in full or in part, guaranteeing the game developers will not have to bear the cost of distributing an in-game virtual award that is more valuable than the commission ultimately received from the reservation.

Thus, providing in-game virtual awards for reserving travel-related experiences improves upon traditional travel rewards systems because in-game virtual awards can be provided nearly instantaneously after the reservation, as compared to traditional rewards which may not be granted weeks or even months after a reservation, when the travel-related experience has already been completed. The faster availability of in-game virtual awards as compared to traditional travel rewards allows for immediate enjoyment of the award and thereby more heavily incentivizes players to make travel reservations.

Atlas Bucks, an in-game currency in a closed-loop ecosystem or economy for the electronic game Atlas Earth, is a perfect game currency to implement these embodiments, but other game rewards can also be used to incentivize travel reservations. In certain examples, the embodiments disclosed herein are implemented to award in-game currency of an electronic game that is location-based.

III. Example Embodiments in an Electronic Game

FIG. 1 shows an example travel search interface 100 provided within an electronic game through which a player initiates reserving a travel-related experience. In some embodiments, the travel search interface 100 is accessed by selecting a menu option within the electronic game to earn free virtual in-game assets, such as in-game currency. For example, as illustrated in FIG. 1, a player accesses the electronic game Atlas Earth and is presented with a header menu 106 indicating "free bucks" are available, which refers to Atlas Bucks, the in-game currency of Atlas Earth. When the "free bucks" menu option is selected, the player is presented with a second menu 108 including several more options, one of which is to "book travel." When the "book travel" menu option is selected, the travel search interface 100 appears and indicates that the player has accessed Atlas Travel, signaling to the user that travel-related experiences can be reserved using the travel search interface 100.

In some embodiments, the travel search interface 100 includes a search bar 102 configured to receive search criteria from the player indicating the type of travel-related experience the player would like to reserve and the dates for which the player would like to make the reservation. For example, as illustrated in FIG. 1, the search bar 102 may include an icon that represents the type of travel-related experience the player is interested in (e.g., hotels, car rentals, flights), a text box for the user to enter the destination the user is interested in, and a calendar feature for selecting the dates for which the player would like to make a reservation. In some embodiments, the travel search interface 100 includes destination icons 104 representing popular or suggested travel destinations which, when selected by the player, allow the player to view travel-related experiences associated with those destinations.

Figure 2:
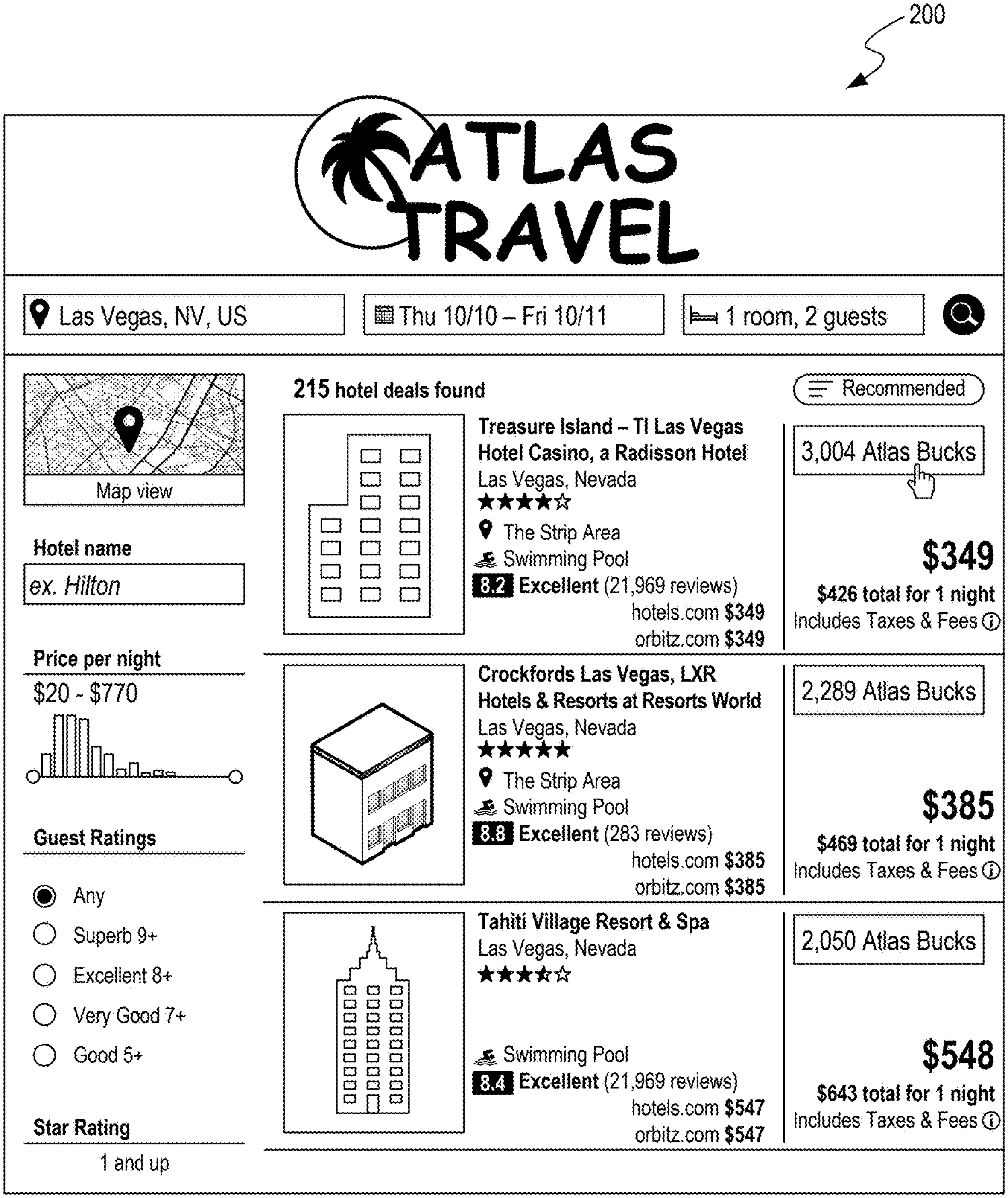
FIG. 2 shows an example travel reservation interface provided with an electronic game through which a player views travel-related experiences and associated in-game virtual awards.

FIG. 2 shows an example travel reservation interface 200 provided with an electronic game through which a player views travel-related experiences and associated in-game virtual awards. In some embodiments, the travel reservation interface 200 displays the search criteria the player input into the search bar 102 of the travel search interface 100 and displays travel-related experiences matching those search criteria. The travel reservation interface 200 may also allow the search criteria to be modified and/or provide additional filters which are used to narrow the list of displayed travel-related experiences. As a user changes the search criteria or filters, the travel reservation interface 200 will update the displayed travel-related experiences accordingly.

In some embodiments, the travel reservation interface 200 displays the in-game virtual award a player will receive for reserving a travel-related experience alongside each displayed travel-related experience. For example, as depicted in FIG. 2, each hotel displayed in the travel reservation interface 200 has a quantity of Atlas Bucks displayed alongside it, which indicates the quantity of Atlas Bucks the player would receive if the player completed a reservation for a stay of a specified duration in that hotel.

Figure 3:
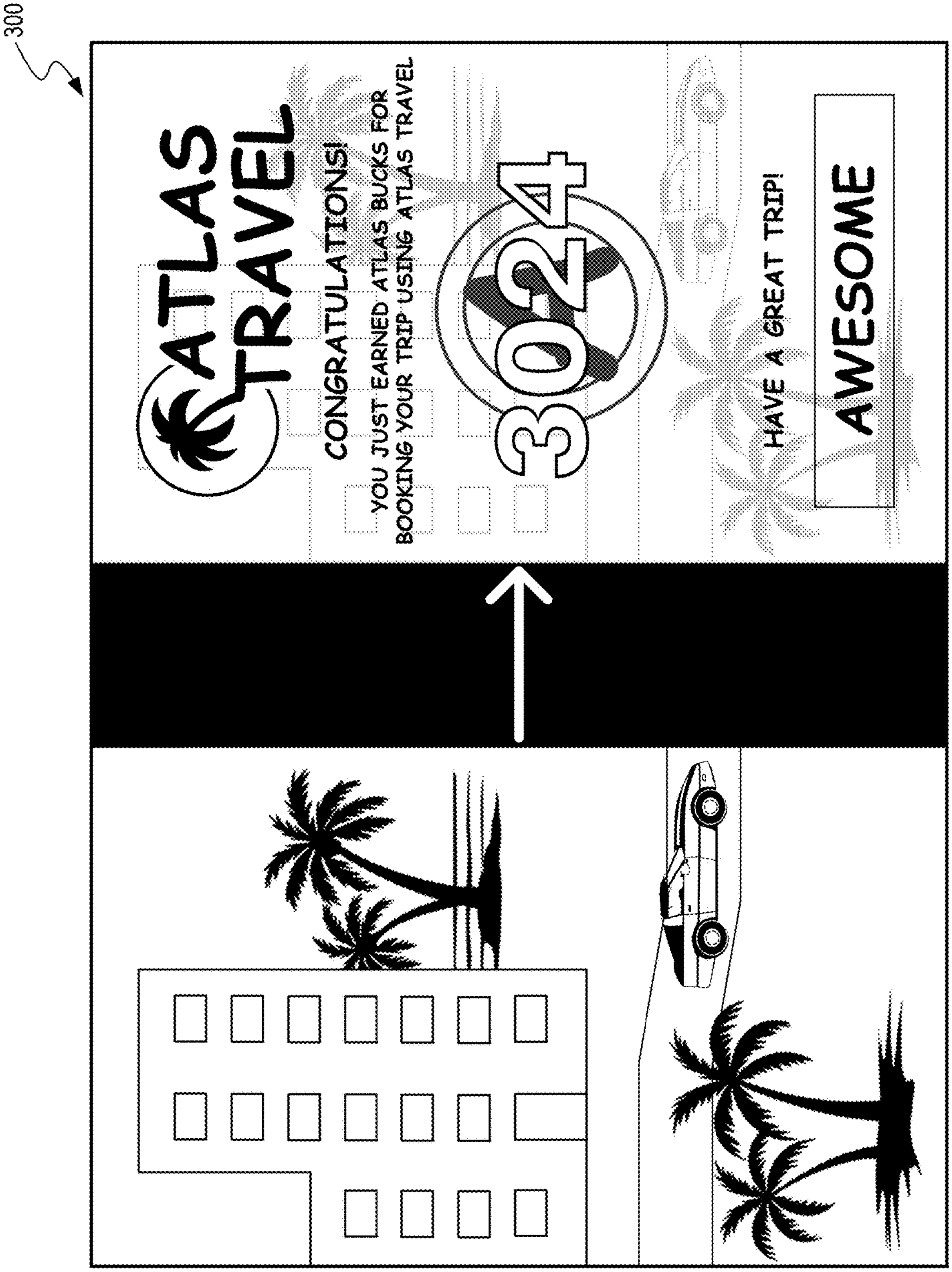
FIG. 3 is an example method of displaying a notification after a travel-related experience is reserved successfully.

FIG. 3 is an example method of displaying a notification 300 after a travel-related experience is reserved successfully. The notification contains information regarding the reserved travel-related experience, such as, for example, information regarding the in-game virtual award received, the in-game currency value associated with the in-game virtual award, the reserved travel-related experience, or a combination of the preceding. In some embodiments, the notification is displayed as an overlay on the electronic game as currently being viewed by the player who reserved the travel-related experience. This overlay effect is illustrated in FIG. 3, which shows the visual appearance of the electronic game without the overlay on the left, and the appearance with the overlay on the right.

In some embodiments involving an overlay notification, gameplay is paused and the player is unable to interact with aspects of the electronic game outside of the notification while the notification is being displayed. In such embodiments, in order to continue interacting with the electronic game, the player must acknowledge receipt of the notification. For example, in FIG. 3, the overlay remains visible and no actions within the electronic game occur until the player selects the "AWESOME" button, indicating the player has acknowledged the notification.

In other embodiments, the notification does not appear as an overlay, but it instead sent to the player by another communication method. For example, the notification may be sent via email, text message, or in-game messaging feature that allows the player to view the notification within the electronic game but without immediately interrupting the player's interaction with the game as an overlay does.

Figure 4A:
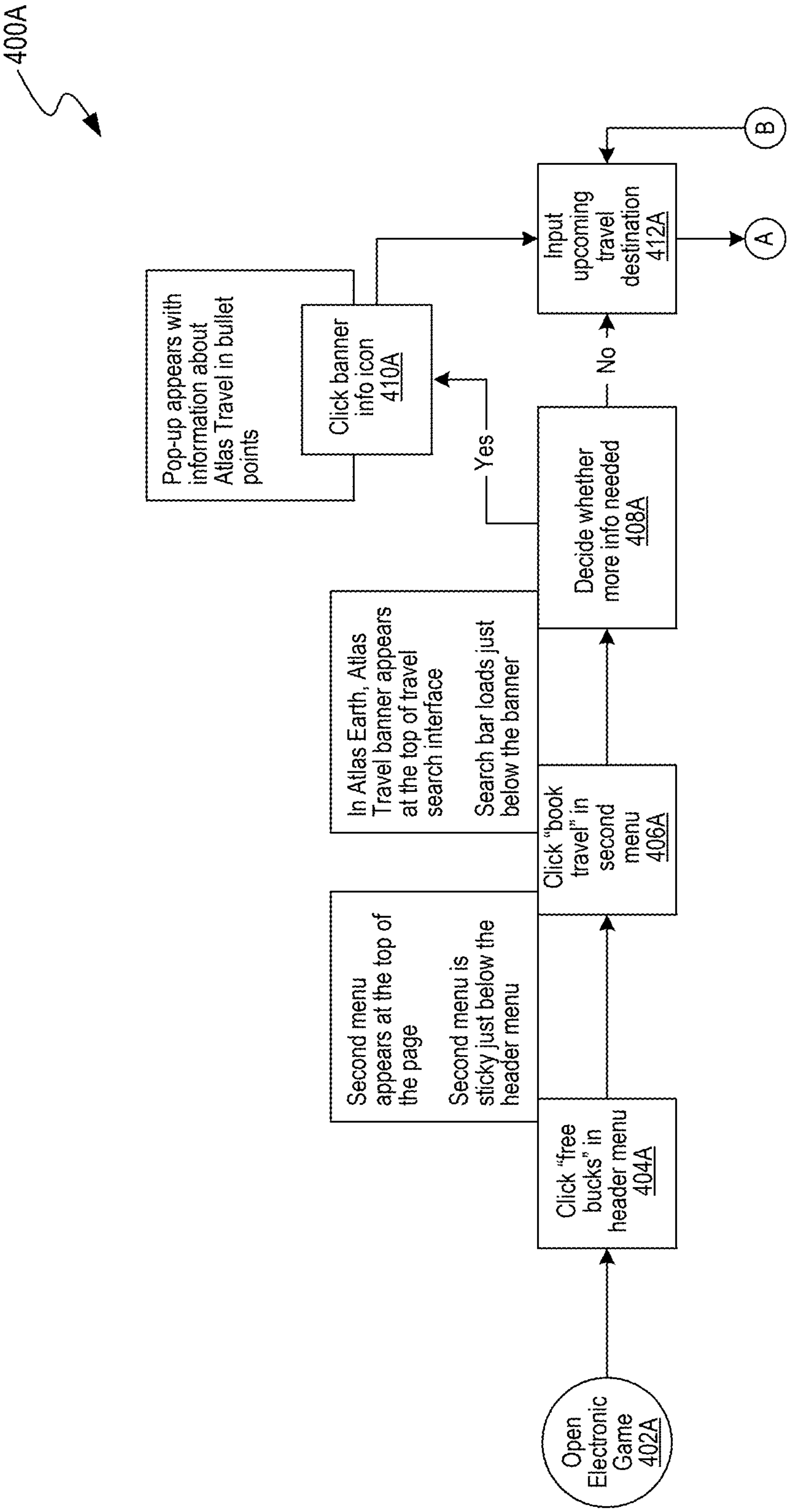
FIGS. 4A and 4B are flowcharts for reserving a travel-related experience and receiving in-game virtual currency in exchange for making the reservation.

FIG. 4 is a flowchart for reserving a travel-related experience and receiving in-game virtual currency in exchange for making the reservation. FIG. 4A illustrates an example method of initiating the reservation process 400A as embodied by Atlas Earth. Although Atlas Earth is used as an example, an analogous method is applicable to any electronic game. At 402A, the electronic game (in this example, Atlas Earth) is accessed. In some embodiments, the electronic game may be accessed using any device capable of connecting to a network, such as a personal computer (PC), tablet computer, mobile device, or game console, for example. The electronic game may further be accessed, for example, via a web browser or dedicated application, either on a PC or mobile device. At 404A, the user clicks the "free bucks" option in a header menu 106, indicating that the user would like to view options for earning free in-game currency. In response to the "free bucks" option being clicked, a second menu 108 appears at the top of the page containing options for how the player may earn Atlas Bucks, the in-game currency of Atlas Earth. This second menu 108 is sticky just below the header menu 106, meaning that the second menu 108 remains visible just below the header menu 106 even if the user navigates away from the second menu 108 using, e.g., a mouse cursor. Both the header menu 106 and second menu 108 are illustrated in FIG. 1.

At 406A, the option to "book travel" is selected from the second menu 108. This selection causes an embodiment of the travel search interface 100 to appear in which the travel search interface 100 includes a stylized Atlas Travel banner at the top and the search bar 102 just below the banner. Such an embodiment is illustrated in FIG. 1. At 408A, the player decides between proceeding to reserve a travel-related experience in the search bar 102 or whether more information is needed before continuing with reserving a travel-related experience. In embodiments where the player decides more information is needed, the player selects a banner info icon at 410A. For example, this banner info icon may appear anywhere within the travel search interface 100 and may be presented to the player as a pop-up asking whether more information is needed. When the banner info icon is selected, a pop-up appears with information about Atlas Travel written in bullet points, highlighting important features of the service such as, e.g., that Atlas Bucks can be earned by making reservations.

In embodiments where the player decides no further information is needed, 410A is not performed but instead the player proceeds to input the name of a travel destination for which the player wishes to reserve a travel-related experience into the search bar 102 at 412A. Completing 412A allows for the reservation process to continue as illustrated in FIG. 4B.

Figure 4B:
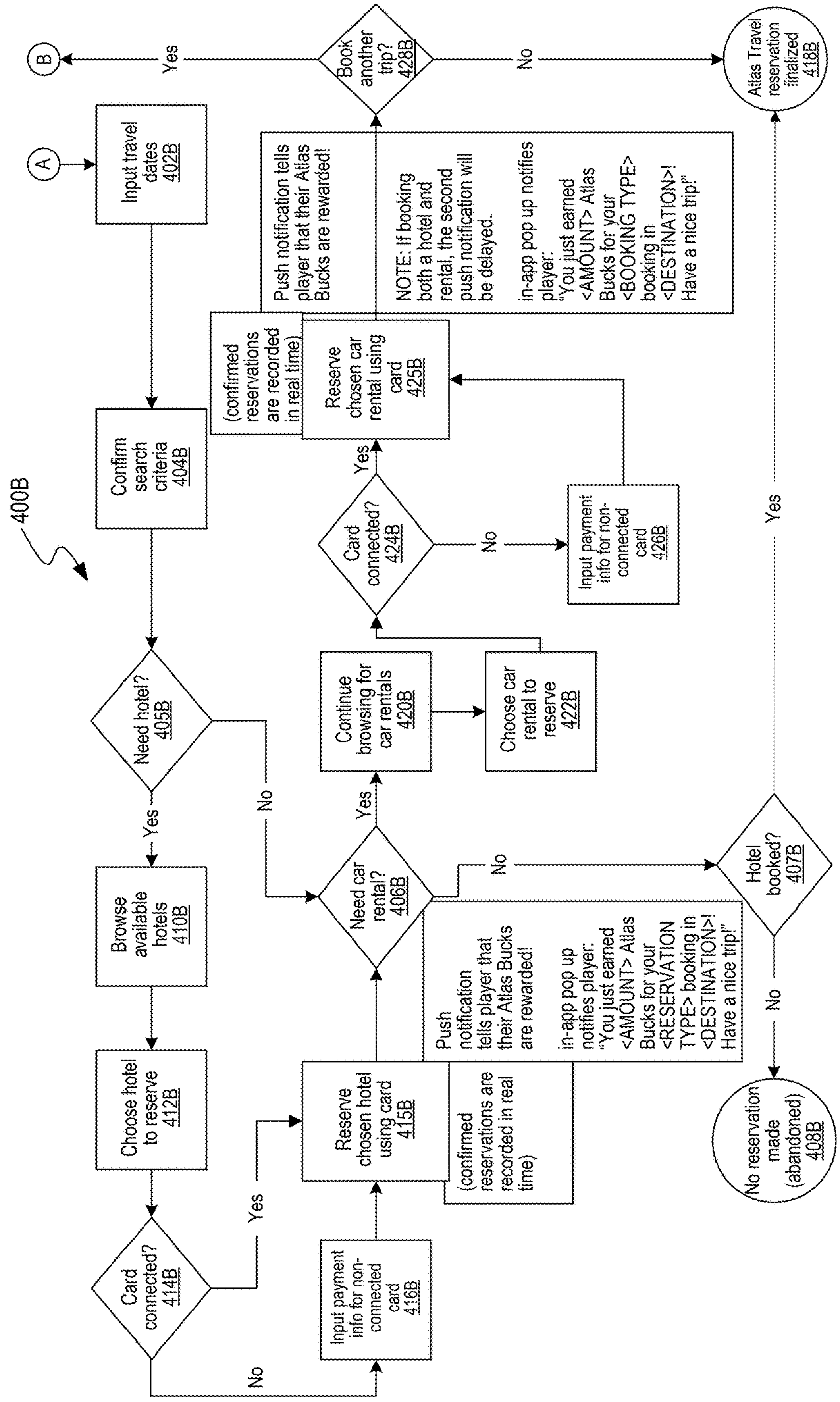

FIG. 4B illustrates an example method of reserving a travel-related experience 400B as embodied by Atlas Earth. At 402B, the player inputs the travel dates for which the travel-related experience will be reserved. These travel dates are combined with the travel destination input at 412A, described in relation to FIG. 4A, to constitute the player's search criteria. The player is then asked to confirm whether the combined dates and destination constitute the search criteria the player would like to use for reserving a travel-related experience at 404B.

In some embodiments, only certain travel-related experiences are available, and when a player indicates that the player does not wish to reserve any of the available travel-related experiences, the reservation attempt is abandoned. For example, in FIG. 4B, only hotels and car rentals can be reserved. At 405B, the player is prompted to indicate whether a hotel reservation is needed. When the player indicates a hotel reservation is not needed, the player is prompted to indicate whether a car rental is needed at 406B. When the player also does not indicate a car rental is needed, whether a hotel has been booked is checked at 407B. In this sequence, no hotel has been booked and therefore the reservation attempt is abandoned without a reservation being made at 408B.

In other embodiments where the player indicates that a hotel reservation is needed, the player is presented with available hotels that match the search criteria received via the travel reservation interface 200 and is enabled to browse the available reservation options at 410B. After browsing the available hotel reservation options, the player chooses a hotel to reserve at 412B. Whether the player has connected a credit or debit card to the electronic game is then checked at 414B. When the player has connected a card, this card is charged the reservation price and the chosen hotel is reserved at 415B. Otherwise, the player is asked to input payment information for a credit or debit card not connected to the electronic game with which the reservation price of the chosen hotel can be paid at 416B, after which 415B is executed and the newly inputted card is charged. The player need not use a connected card or even a card belonging to the player for the electronic game to associate the reservation with the player, as the electronic game determines the identity of the player based on the player's connection to the game itself (e.g., via a gaming account to which the player logs in) rather than based on the card information.

In some embodiments, the electronic game does not store information about the card charged to make the reservation directly, but instead receives a token representing the card from a transaction processing entity, such as a credit card company or bank. This token may be generated by tokenizing the card number being used by the player (e.g., using a hash or randomizer mechanism) to generate a token that represents the player's credit card or other source of funds. The token may also be encrypted so that, if intercepted by an unscrupulous party, the player's sensitive credit card information cannot be easily revealed or stolen. In some embodiments, the token or a token ID associated with the token (desirably in addition to a user ID associated with the player) may be packetized and communicated from the transaction processing entity to the electronic game. This tokenization process limits both the electronic game's access and its liabilities associated with maintaining or storing the player's sensitive data under certain regulations. The electronic game may store the token and user ID in a database to identify the player and player-related transactions within the game.

In some embodiments, whether the reservation is confirmed is recorded in real time and, upon determination that a reservation was made successfully, a push notification is displayed indicating to a player that an in-game award has been granted to the player. For example, this push notification may contain information regarding the in-game virtual award received, the in-game currency value associated with the in-game virtual award, the reserved travel-related experience, or a combination of the preceding. An example method of displaying a notification 300 is illustrated in FIG. 3.

In some embodiments, a player who has not yet been prompted about a car rental is now prompted whether a car rental reservation is needed at 406B. When the player indicates such a reservation is not needed, whether a hotel has been booked is checked at 407B. In this sequence, a hotel and no car has been reserved, so the hotel reservation alone is finalized at 418B. When the player indicates a car rental reservation is needed, the player is presented with available car rental reservations that match the search criteria received via the travel reservation interface 200 and is enabled to browse those reservations at 420B. At 422B, the player chooses an available car rental to reserve. Whether the player has connected a credit or debit card to the electronic game is then checked at 424B. When the player has connected a card, this card is charged the reservation price and the chosen car rental is reserved at 425B. Otherwise, the player is asked to input payment information for a credit or debit card with which the reservation price of the chosen car rental can be paid at 426B, after which 425B is executed and the newly inputted card is charged.

In some embodiments where a player reserves more than one travel-related experience, they will receive different notifications containing different information (about, e.g., the amount of in-game currency awarded) and with different in-app animations (e.g., animated fanfare) for each type of reservation. In such embodiments, there will be a delay between the different notifications such that the information about the two reservations is not received back-to-back. Whether the car rental reservation is confirmed is still recorded in real time but, upon determination that a reservation was made successfully, the push notification associated with the car rental reservation is not displayed right away.

At 428B, the user decides whether to book another trip. When the user would like to book another trip, the user is directed back to the travel search interface 100 at 412A of FIG. 4A and begins the reservation process again. Otherwise, the user has made all the desired reservations, and the Atlas Travel reservations made are finalized at 418B.

Figure 5:
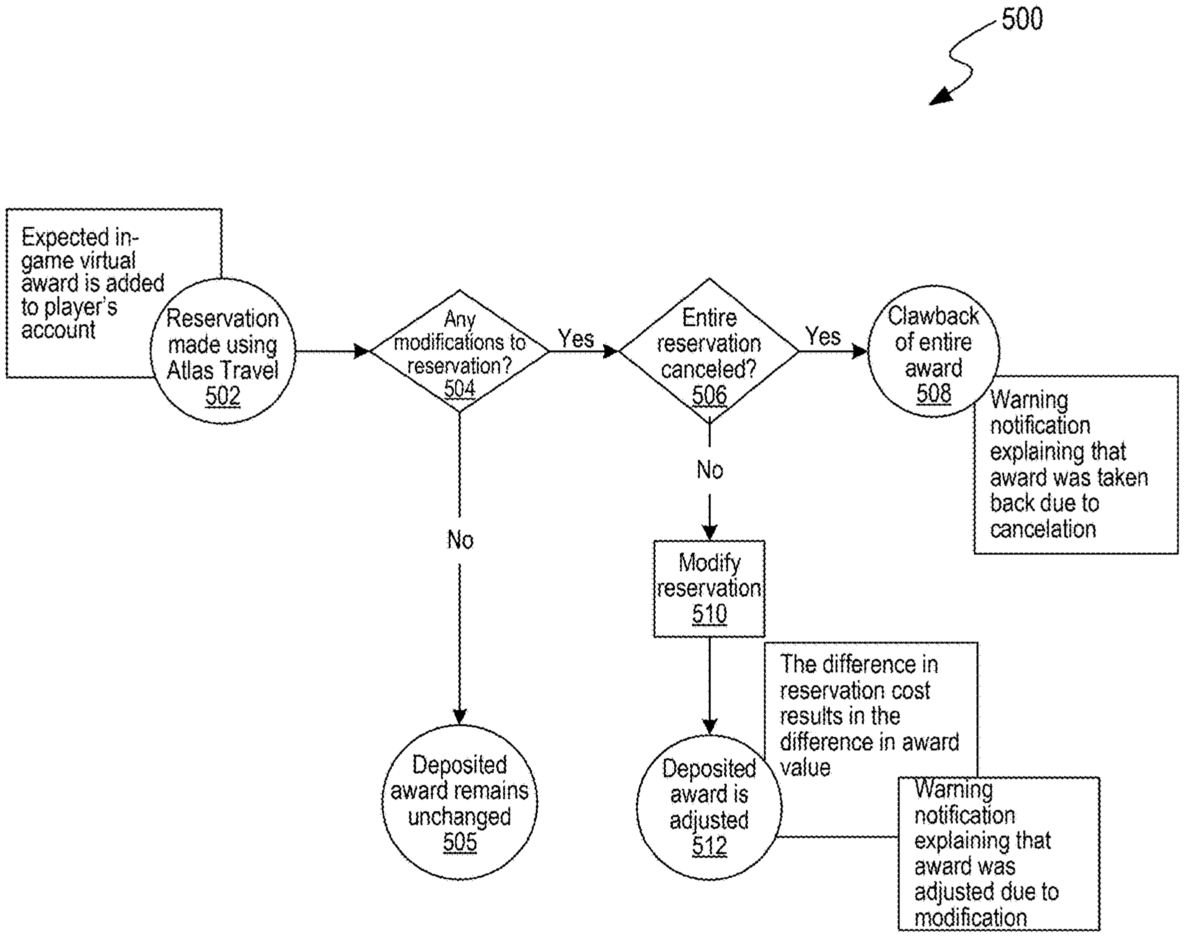
FIG. 5 is an example rewards flowchart for rewarding a player of an electronic game for executing a travel-related transaction and handling modifications to the travel-related transaction.

FIG. 5 is an example rewards flowchart 500 for rewarding a player of an electronic game for reserving a travel-related experience and handling modifications to the travel-related experience. The steps in FIG. 5 are enabled based on the reward (e.g., in-game currency) being part of a closed-loop ecosystem that is controllable by a developer of the electronic game. The closed-loop ecosystem means that any value added into the electronic game remains within the game indefinitely unless changes are made by the game's developers, allowing any in-game virtual awards granted to players to be clawed back, either in full or in part, at any time. FIG. 5 illustrates an example rewards flowchart 500 using Atlas Earth, but an analogous method may be applied to any electronic game.

At 502, a reservation is made using Atlas Travel, resulting in the player being granted an in-game virtual award. In some embodiments, this reservation is made in accordance with the flowcharts of FIGS. 4A and 4B. Subsequently, at 504, whether the player has made any modifications related to that reservation is checked. In embodiments where no modification has been made, the deposited in-game virtual award remains unchanged at 505 and no further action is taken. However, in embodiments where a modification of all or part of the reservation is made, whether the entire reservation has been canceled is then checked at 506. When the entire reservation has been cancelled, the entire in-game virtual award is clawed back at 508. This clawing back ensures scenarios are avoided where players make reservations with no intention of completing the reserved travel-related experience, solely for the purpose of earning in-game virtual awards. Clawing back also ensures that game developers do not have to distribute in-game virtual awards of greater value than any commission the developers receive from facilitating the reservation.

In some embodiments, the in-game virtual award is not clawed back in the same form in which it was awarded. This may happen, for example, because a player was awarded in-game currency which was entirely spent on in-game assets before clawback occurred. In such a scenario, in-game currency may be deducted from the player such that the player's account has a negative in-game currency balance. Alternatively, some or all of the in-game assets purchased with the awarded in-game currency may be removed from the player's account. In some embodiments, when clawback of an entire in-game virtual award occurs, a warning notification is presented to the player explaining that the in-game virtual award was taken back due to cancelation of the previously made reservation.

In embodiments where a reservation has been modified but not canceled entirely, the reservation is modified to the player's new specifications at 510. The deposited in-game virtual award is then adjusted based on the modified reservation at 512. In some embodiments, the difference in commission earned from the original and modified reservations determines how the in-game virtual award is adjusted. For example, many in-game currencies have an effective exchange rate with real-world currencies which is based on the price, in real-world currency, at which the currency can be purchased (e.g., 20 Atlas Bucks can be purchased for $1 USD). Thus, if a player of Atlas Earth were to adjust a reservation made within the game such that Atlas Earth would receive $100 USD less in commission, 2000 Atlas Bucks would be deducted from the player's account. When the reservation is adjusted to have a higher value, the game developers may also choose to increase the in-game virtual award granted to the player. In some embodiments, when adjustment of an in-game virtual award occurs, a warning notification is presented to the player explaining that the in-game virtual award was adjusted due to a modification of the previously made reservation.

Figure 6:
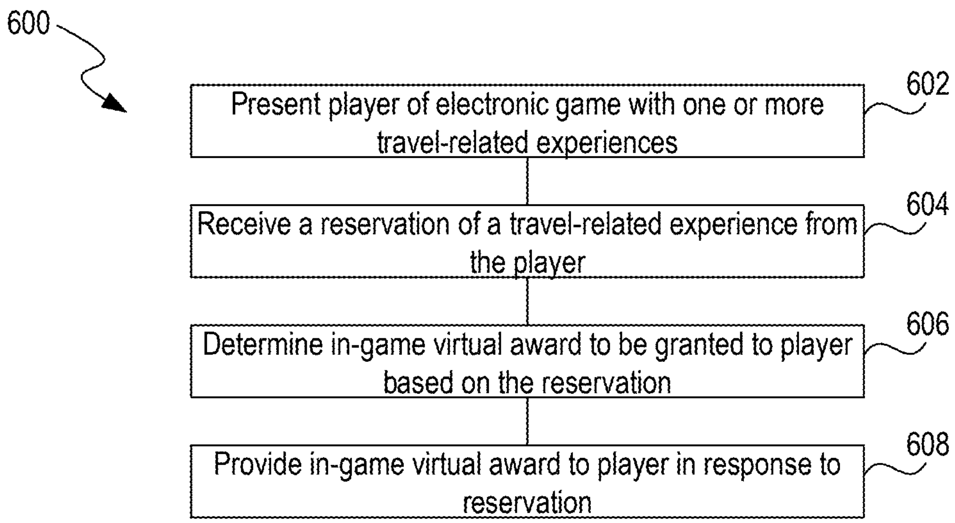
FIG. 6 is a flow diagram of an example method of providing a player of an electronic game with an in-game virtual award for reserving a travel-related experience.

FIG. 6 is a flow diagram of an example method 600 of providing a player of an electronic game with an in-game virtual award for reserving a travel-related experience. At 602, a player of an electronic game is presented with one or more travel-related experiences which are available to be reserved by the player. In some embodiments, the travel-related experiences presented are determined by the search criteria the player inputs into a search bar 102, as described in relation to FIG. 1. At 604, a reservation of a travel-related experience is received from the player. In some embodiments, the reservation is confirmed and recorded in real time by the electronic game by communicating with the travel site or other provider offering the travel-related experience to ensure that the reservation is available on the dates desired by the player and that any payment required from the player was processed successfully.

At 606, an in-game virtual award to be granted to the player is determined based on the reservation. In some embodiments, the in-game virtual award will have an in-game currency value determined by the developers of the electronic game, corresponding to the amount of in-game currency that must be spent to acquire the in-game virtual award. In such embodiments, the in-game currency value of the in-game virtual award will have a corresponding real-world currency value (based on, for example, the amount of USD required to purchase the in-game currency), and the in-game virtual award can be determined such that its equivalent real-world currency value is less than or equal to a projected commission the electronic game would earn from facilitating the reservation, ensuring the developers of the electronic game do not give away an in-game virtual award more valuable than the commission the developers would receive.

In other embodiments, the in-game virtual award will be a promotional item not otherwise available within the electronic game. For example, an electronic game may establish a partnership with a hotel such that anyone who reserves a stay at that hotel through the electronic game is granted an in-game asset representing the hotel that cannot be earned any other way. In such embodiments, the in-game virtual award will not necessarily have an equivalent in-game currency value, since the promotional item by its nature cannot be purchased with in-game currency. However, the game developers may assign the promotional item an equivalent in-game currency value for the purposes of deducting some or all of that value from a player's account if the player modifies or cancels the reservation used to earn the promotional item.

In still other embodiments, the in-game virtual award is fungible in-game currency itself. As described above, fungible in-game currency has a corresponding real-world currency value and can be exchanged for other in-game assets within the electronic game. For example, the fungible in-game currency may be exchanged for items within the electronic game or access to premium features within the game. However, in embodiments where the electronic game implements a closed-loop ecosystem, the fungible in-game currency cannot be converted into assets of value outside of the electronic game, such as USD, once it is earned. In embodiments where the in-game virtual award is fungible in-game currency, the amount of in-game currency granted for making a certain reservation may be determined by first determining the commission the electronic game would earn for facilitating that reservation. The value of this commission is then divided by the corresponding real-world currency value of one unit of in-game currency, which is determined as described above. The resulting value is the effective in-game currency value of the commission and is set as the in-game virtual award.

At 608, the in-game virtual award determined at 606 is provided to the player in response to the reservation. In some embodiments, the in-game virtual award is provided nearly instantly or in real-time after a travel-related experience is reserved. This near-instant delivery is enabled by the near-instantaneous speed of electronic communication that occurs between the player, electronic game, and the provider of the travel-related experience involved in making the reservation. In such embodiments, the in-game virtual award can be granted before the player begins or completes the travel-related experience, allowing the award to be enjoyed sooner than traditional travel rewards. Although the game developers will not yet have received any commission for facilitating reservation of the travel-related experience, granting the in-game virtual award before the player begins the travel-related experience carries little financial risk. Risk is avoided by implementing a closed-loop ecosystem within the electronic game, which ensures the value of the in-game virtual award can never be removed from the game by the player. This allows the award or some in-game asset of equal value to always be clawed back by the game developers, guaranteeing the game developers will not have to bear the cost of distributing an in-game virtual award that is more valuable than the commission ultimately received from the reservation.

IV. Example Embodiment in a Travel Reservation Service

Figure 7:
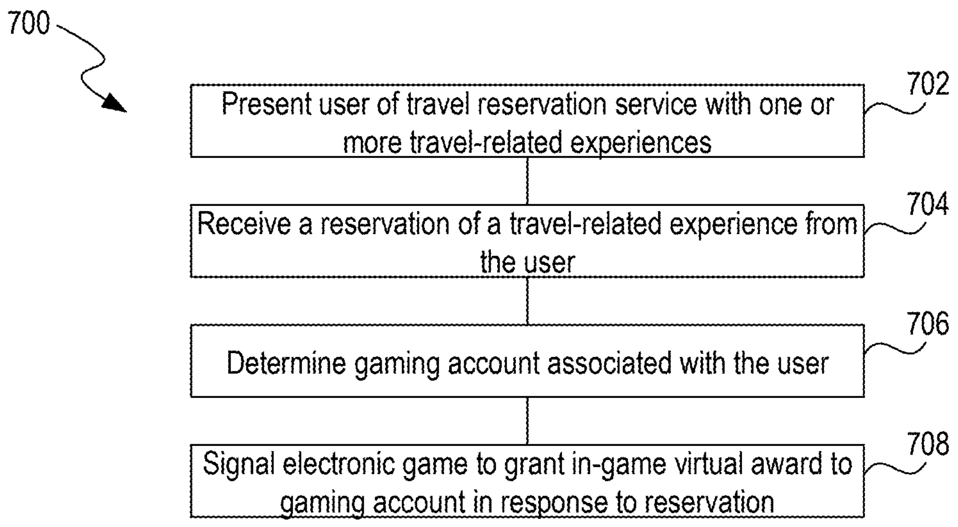
FIG. 7 is a flow diagram of an example method of signaling that a user of a travel reservation service has earned an in-game virtual award for reserving a travel-related experience.

FIG. 7 is a flow diagram of an example method of signaling that a user of a travel reservation service has earned an in-game virtual award for reserving a travel-related experience. At 702, a user of a travel reservation service is presented with one or more travel-related experiences which are available to be reserved by the user. In some embodiments, the travel-related experiences presented are determined by the search criteria the user inputs into a search bar 102, as described in relation to FIG. 1 but implemented by the travel reservation service rather than in an electronic game. Subsequently at 704, a reservation of a travel-related experience is received from the user. In some embodiments, the reservation is confirmed and recorded in real time by the travel reservation service by communicating with a payment processor and/or the provider of the travel-related experience to ensure that the reservation is available on the dates desired by the user and that any payment required from the user was processed successfully.

At 706, the travel reservation service determines a gaming account associated with the user. The gaming account is an account that allows the user to access an electronic game and through which in-game virtual awards for the electronic game can be granted to the user. In some embodiments, the user will link their gaming account to an account the user has made with the travel reservation service, allowing the travel reservation service to save a record of that gaming account in advance of the user reserving a travel-related experience. Next, the travel reservation service signals the electronic game to grant an in-game virtual award to the gaming account in response to the reservation at 708. In some embodiments, the signal is sent nearly instantly or in real-time after a travel-related experience is reserved. This near-instant delivery is enabled by the near-instantaneous speed of electronic communication that occurs between the user, electronic game, and travel reservation service involved in making the reservation. In such embodiments, the electronic game may then grant the in-game virtual award to the user before the player begins or completes the travel-related experience, as described in FIG. 6, allowing the award to be enjoyed sooner than traditional travel rewards.

In some embodiments, the travel reservation service may determine that the user is associated with multiple gaming accounts, each corresponding to a different electronic game. In such embodiments, the travel reservation service may signal each of these electronic games to grant an in-game virtual award to the user. For example, the travel reservation service may calculate a total value of an award to grant a player and divide that value between multiple in-game virtual awards in the multiple electronic games for which the user has a gaming account. In other embodiments, the travel reservation service may prompt the user to decide which electronic game should be signaled to grant the user an in-game virtual award, and that electronic game will then be signaled by the travel reservation service to grant the user an in-game virtual award of the full value the user has earned.

In some embodiments, a notification is displayed indicating to a player that an in-game award has been granted to the player. For example, this notification may contain information regarding the in-game virtual award received, the in-game currency value associated with the in-game virtual award, the reserved travel-related experience, or a combination of the preceding. In some embodiments, the notification may appear as an overlay on the travel reservation service, analogous to the overlay on an electronic game illustrated in FIG. 3. In other embodiments, the notification does not appear as an overlay, but it instead sent to the user by other means. For example, the notification may be sent via email, text message, or messaging feature provided by the travel reservation service.

In some embodiments, the user is able to reserve multiple travel-related experiences through the travel reservation service in the same session and receive an in-game virtual award for each reservation made. In such embodiments, a separate notification as described above may be sent for each travel-related experience reserved and each notification may be set back from one another by a fixed time delay such that the information about each reservation is not received back-to-back.

In some embodiments, the in-game virtual award that the travel reservation service signals the electronic game to grant is a promotional item not otherwise available within the electronic game. The nature of this promotional item is the same as described in relation to FIG. 6. In other embodiments, the in-game virtual award signaled to the electronic game is fungible in-game currency of the nature described in relation to FIG. 6.

In some embodiments where the user modifies or cancels a reservation made with the travel reservation service, the travel reservation service receives an indication of this modification or cancellation and displays a warning notification indicating to the user that the in-game virtual award granted to the user may be modified or removed in response to this change. In such embodiments, the travel reservation service may then signal the electronic game that changes were made to the reservation, allowing the electronic game to modify the granted in-game virtual award accordingly. For example, the electronic game may do so by following the steps illustrated in the rewards flowchart 500 of FIG. 5.

IV. Example Implementation

Figure 8:
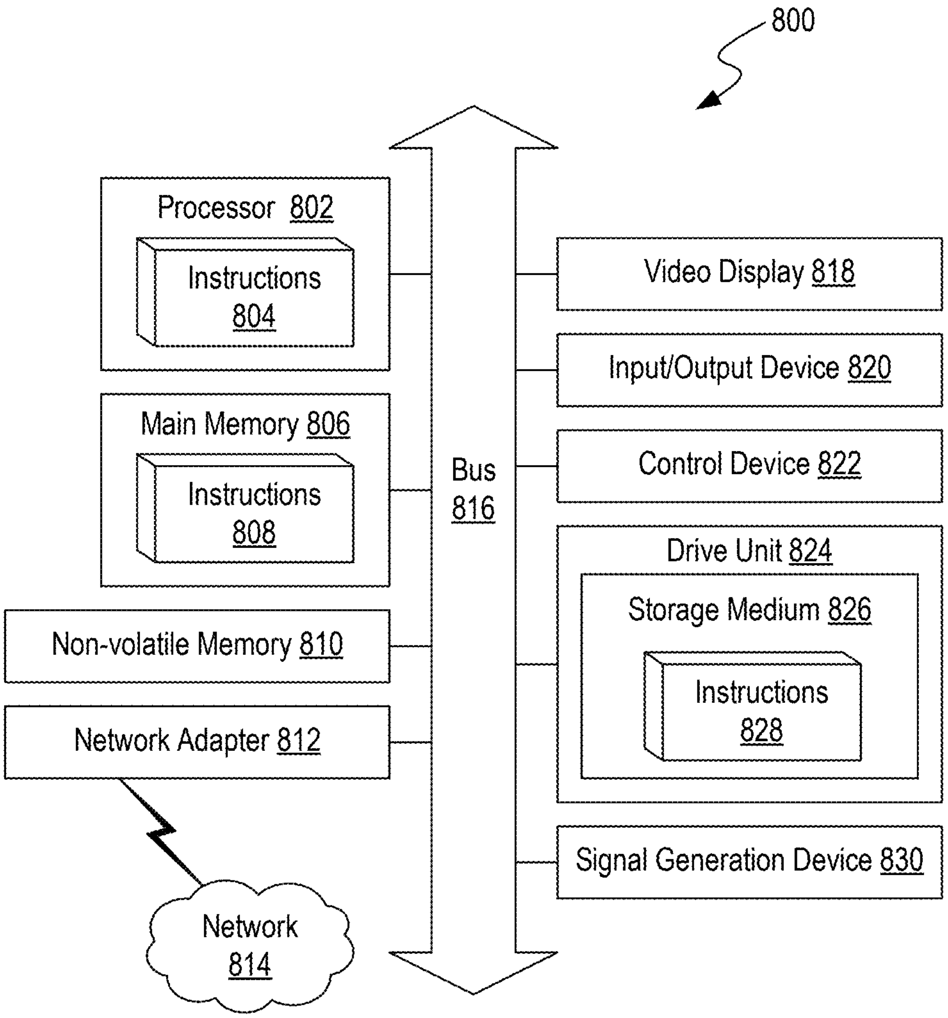
FIG. 8 is a block diagram that illustrates an example of a computer system in which at least some embodiments described herein can be implemented.

FIG. 8 is a block diagram that illustrates an example of a computer system 800 in which at least some embodiments described herein can be implemented. For example, a gaming system or environment for hosting and providing one or more electronic games is implemented on one or more computer systems 800. In some embodiments, the computer system 800 is a gaming server. Accordingly, the computer system 800 can implement embodiments disclosed herein to enable players of an electronic game to earn in-game virtual awards nearly instantly or in real-time when the players reserve a travel-related experience, such as booking a hotel or car rental.

As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

Reference herein to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computer-implemented method implemented by a travel reservation service, the method comprising:

receiving an indication of a desired travel date from a user;

causing display to the user via an interface of one or more travel-related experiences available on the desired travel date;

receiving an electronic reservation from the user of a travel-related experience from the one or more travel-related experiences, wherein the electronic reservation includes a confirmation that the user made a payment to reserve the travel-related experience;

calculating a projected commission based on the payment made for the electronic reservation;

determining a gaming account associated with the user, wherein the gaming account is an account that allows the user to access an electronic game;

signaling the electronic game to grant an in-game virtual award to the gaming account, wherein the in-game virtual award has an in-game currency value within the electronic game, wherein the in-game currency value has a corresponding real-world currency value less than or equal to the projected commission, and wherein the in-game virtual award is granted to the gaming account immediately after signaling the electronic game to grant the in-game virtual award, thereby allowing the user to access the in-game virtual award before beginning or completing the travel-related experience and before the travel reservation service receives the projected commission;

upon receiving a first indication that the electronic reservation was modified, recalculating the projected commission based on a modified payment made for the modified electronic reservation and signaling the electronic game that the projected commission has been recalculated, allowing the electronic game to modify the in-game virtual award accordingly; and upon receiving a second indication that the electronic reservation was cancelled, signaling the electronic game that the electronic reservation was cancelled, allowing the electronic game to revoke the in-game virtual award.

2. The computer-implemented method of claim 1, further comprising:

prompting the user to reserve an accompanying travel-related experience, wherein the accompanying travel-related experience relates to the travel-related experience the user has already reserved and is available on the desired travel date;

receiving an indication of interest from the user in reserving an accompanying travel-related experience; and presenting the user with one or more accompanying travel-related experiences available on the desired travel date.

3. The computer-implemented method of claim 2, further comprising:

receiving an accompanying reservation from the user for an accompanying travel-related experience from the one or more accompanying travel-related experiences, wherein the accompanying reservation includes a confirmation that the user made a second payment to reserve the accompanying travel-related experience;

calculating a second projected commission based on the second payment made for the accompanying reservation;

signaling the electronic game to grant a second in-game virtual award to the gaming account, wherein the second in-game virtual award has a second in-game currency value within the electronic game, wherein the second in-game currency value has a second corresponding real-world currency value less than or equal to the second projected commission, and wherein the second in-game virtual award is granted to the gaming account immediately after signaling the electronic game to grant the second in-game virtual award, thereby allowing the user to access the second in-game virtual award before beginning or completing the accompanying travel-related experience and before the travel reservation service receives the second projected commission;

upon receiving an indication that the accompanying reservation was modified, recalculating the second projected commission based on a second modified payment made for the modified accompanying reservation and signaling the electronic game that the second projected commission has been recalculated, allowing the electronic game to modify the second in-game virtual award accordingly; and upon receiving an indication that the accompanying reservation was cancelled, signaling the electronic game that the accompanying reservation was cancelled, allowing the electronic game to revoke the second in-game virtual award.

4. The computer-implemented method of claim 3, further comprising:

receiving an indication from the electronic game that the in-game virtual award has been granted;

sending a notification to the user indicating that the user has received the in-game virtual award, wherein the notification contains information regarding at least one of the in-game virtual award received or the in-game currency value of the in-game virtual award, and wherein the notification contains information regarding the travel-related experience; and sending, after a fixed time delay, a second notification to the user indicating that the user has received the second in-game virtual award, wherein the second notification contains information regarding at least one of the second in-game virtual award received or the in-game currency value of the second in-game virtual award, and wherein the second notification contains information regarding the accompanying travel-related experience.

5. The computer-implemented method of claim 1, further comprising:

receiving an indication from the electronic game that the in-game virtual award has been granted;

sending a notification to the user indicating that the user has received the in-game virtual award, wherein the notification contains information regarding at least one of the in-game virtual award received or the in-game currency value of the in-game virtual award, and wherein the notification contains information regarding the travel-related experience.

6. The computer-implemented method of claim 1, wherein:

the in-game virtual award includes a promotional item not otherwise available within the electronic game.

7. The computer-implemented method of claim 1, wherein:

the in-game virtual award includes fungible in-game currency, wherein the fungible in-game currency has a corresponding real-world currency value, and wherein the fungible in-game currency can be exchanged for at least one of items within the electronic game or access to premium features within the electronic game.

8. The computer-implemented method of claim 1, further comprising:

upon receiving an indication that the electronic reservation was modified or cancelled, displaying at least one of a warning notification indicating to the user that the in-game virtual award may be modified or removed in response to the modification or cancellation.

9. A non-transitory, computer-readable storage medium comprising instructions recorded thereon, wherein the instructions, when executed by at least one data processor of a system, cause the system to:

present a user of a travel reservation service with one or more travel-related experiences;

receive a reservation from the user of a travel-related experience from the one or more travel-related experiences, wherein the reservation includes a confirmation that the user made a payment to reserve the travel-related experience;

determine a gaming account associated with the user, wherein the gaming account is an account that allows the user to access an electronic game;

signal the electronic game to grant an in-game virtual award to the gaming account in response to the reservation, thereby allowing the user to access the in-game virtual award before beginning or completing the travel-related experience;

wherein the in-game virtual award includes fungible in-game currency that has a corresponding real-world currency value, and wherein the fungible in-game currency can be exchanged for at least one of items within the electronic game or access to premium features within the electronic game;

upon receiving a first indication that the reservation was modified, signal the electronic game that the reservation has been modified, allowing the electronic game to modify the in-game virtual award accordingly; and upon receiving a second indication that the reservation was cancelled, signal the electronic game that the reservation was cancelled, allowing the electronic game to revoke the in-game virtual award.

10. The non-transitory, computer-readable storage medium of claim 9, further comprising instructions to:

prompt the user to reserve an accompanying travel-related experience, wherein the accompanying travel-related experience relates to the travel-related experience the user has already reserved;

receive an indication of interest from the user in reserving an accompanying travel-related experience; and present the user with one or more accompanying travel-related experiences.

11. The non-transitory, computer-readable storage medium of claim 9, further comprising instructions to:

receive an indication from the electronic game that the in-game virtual award has been granted;

send a notification to the user indicating that the user has received the in-game virtual award, wherein the notification contains information regarding at least one of the in-game virtual award received or an in-game currency value of the in-game virtual award, and wherein the notification contains information regarding the travel-related experience.

12. The non-transitory, computer-readable storage medium of claim 9, wherein:

the in-game virtual award includes a promotional item not otherwise available within the electronic game.

13. A system comprising:

at least one hardware processor; and at least one non-transitory memory storing instructions, which, when executed by the at least one hardware processor, cause the system to:

present a user of an electronic game with one or more travel-related experiences;

receive a reservation from the user of a travel-related experience from the one or more travel-related experiences, wherein the reservation includes a confirmation that the user made a payment to reserve the travel-related experience;

determine an in-game virtual award to be awarded to the user based on the reservation; and provide the in-game virtual award to the user within the electronic game in response to the reservation, thereby allowing the user to access the in-game virtual award before beginning or completing the travel-related experience, wherein the in-game virtual award includes fungible in-game currency that has a corresponding real-world currency value and can be exchanged for at least one of items within the electronic game or access to features within the electronic game;

upon receiving a first indication that the reservation was modified, signal the electronic game that the reservation has been modified, allowing the electronic game to modify the in-game virtual award accordingly; and upon receiving a second indication that the reservation was cancelled, signal the electronic game that the reservation was cancelled, allowing the electronic game to revoke the in-game virtual award.

14. The system of claim 13, further comprising instructions causing the system to:

prompt the user to reserve an accompanying travel-related experience, wherein the accompanying travel-related experience relates to the travel-related experience the user has already reserved;

receive an indication of interest from the user in reserving an accompanying travel-related experience; and present the user with one or more accompanying travel-related experiences.

15. The system of claim 13, further comprising instructions causing the system to:

receive an indication from the electronic game that the in-game virtual award has been granted;

send a notification to the user indicating that the user has received the in-game virtual award, wherein the notification contains information regarding at least one of the in-game virtual award received or an in-game currency value of the in-game virtual award, and wherein the notification contains information regarding the travel-related experience.

16. The system of claim 13, wherein:

the in-game virtual award includes a promotional item not otherwise available within the electronic game.

* * * * *